(12) United States Patent
Delpier et al.

(10) Patent No.: US 10,296,055 B2
(45) Date of Patent: May 21, 2019

(54) ADJUSTING THE CENTER OF MASS OF A COMPUTING DEVICE

(71) Applicant: HEWLETT-PACKARD DEVELOPMENT COMPANY, L.P., Houston, TX (US)

(72) Inventors: Michael Delpier, Houston, TX (US); Mark Senatori, Houston, TX (US); Dimitre Mehandjiysky, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 19 days.

(21) Appl. No.: 15/542,856

(22) PCT Filed: Apr. 14, 2015

(86) PCT No.: PCT/US2015/025679
§ 371 (c)(1),
(2) Date: Jul. 11, 2017

(87) PCT Pub. No.: WO2016/167744
PCT Pub. Date: Oct. 20, 2016

(65) Prior Publication Data
US 2018/0024595 A1     Jan. 25, 2018

(51) Int. Cl.
*G06F 1/16* (2006.01)
(52) U.S. Cl.
CPC .......... *G06F 1/1681* (2013.01); *G06F 1/1616* (2013.01); *G06F 1/1624* (2013.01)

(58) Field of Classification Search
CPC ..... G06F 1/1616; G06F 1/1624; G06F 1/1681
See application file for complete search history.

(56) References Cited

U.S. PATENT DOCUMENTS

| | | | |
|---|---|---|---|
| 6,028,768 A * | 2/2000 | Cipolla | G06F 1/1616 361/679.12 |
| 6,078,495 A | 6/2000 | Cipolla et al. | |
| 6,870,730 B2 | 3/2005 | Riddiford et al. | |
| 8,467,179 B2 | 6/2013 | Probst et al. | |
| 8,599,542 B1 | 12/2013 | Healey et al. | |
| 8,724,312 B2 | 5/2014 | Jones et al. | |
| 2002/0080570 A1* | 6/2002 | Riddiford | G06F 1/1616 361/679.34 |
| 2008/0174569 A1 | 7/2008 | Riddiford | |
| 2010/0271770 A1 | 10/2010 | Sellers | |
| 2010/0294909 A1* | 11/2010 | Hauser | A47B 23/043 248/456 |

(Continued)

OTHER PUBLICATIONS

Nadel B.; "Groundbreaking Laptop Designs Offer New Ways to Work and Play"; Jun. 14, 2010, 23 pages.

*Primary Examiner* — Steven T Sawyer
*Assistant Examiner* — Sagar Shrestha
(74) *Attorney, Agent, or Firm* — Fabian VanCott (57) ABSTRACT

An example system for adjusting the center of mass of a computing device includes a base slidably coupled to a first portion of the computing device. The base repositions the first portion of the computing device relative to the base. A first hinge couples the first portion and a second portion, rotates the second portion relative to the first portion about an axis of rotation, and repositions the first portion of the computing device relative to the base.

17 Claims, 10 Drawing Sheets

(56) References Cited

U.S. PATENT DOCUMENTS

| | | | |
|---|---|---|---|
| 2011/0188187 A1* | 8/2011 | Barnett | G06F 1/1616 361/679.01 |
| 2013/0127730 A1 | 5/2013 | Lee et al. | |
| 2013/0214661 A1 | 8/2013 | McBroom et al. | |
| 2015/0021457 A1 | 1/2015 | Liu | |
| 2015/0036273 A1* | 2/2015 | Hui | G06F 1/1654 361/679.08 |
| 2015/0042567 A1 | 2/2015 | Funakoshi et al. | |
| 2015/0043140 A1* | 2/2015 | Liang | G06F 1/1601 361/679.06 |

* cited by examiner

ADJUSTING THE CENTER OF MASS OF A COMPUTING DEVICE

BACKGROUND

Laptop, notebook, and tablet computing devices are computing devices that utilize a clamshell form factor and are suitable for mobile computing use. The clamshell form factor provides a keyboard, touch mouse pad, and other input devices on a first or lower portion of the clamshell form factor. A display device may be included in a second or top portion of the clamshell form factor. The first portion and second portion are coupled using a hinge system, for example. The interface components including the keyboard, touch mouse pad, display device, and other interface components are kept inside the clamshell form factor when in a closed orientation. This provides more surface area than when the device is in an open position, and the interface components are protected when the clamshell form factor computing device is closed.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

As mentioned above, the interface components including the keyboard, touch mouse pad, display device, and other interface components are kept inside a clamshell form factor when the laptop, notebook, or tablet computing devices are in a closed orientation. This provides more surface area than when the device is in an open position, and the interface components are protected when the clamshell is closed. However, in many of these clamshell form factor computing devices, the center of gravity shifts dramatically as the computing device is opened due to the weight of the second portion of the computing device including the display.

In some computing devices such as tablet devices that use selectively attachable keyboard/touch mouse pad interface components, the shift in the center of gravity is so severe that tipping over of the computing device is possible due to the weight of the display device outweighing the keyboard/touch mouse pad interface components. This undesirable tipping over of the computing device may result in damage to the computing device. In the least, the undesirable tipping over of the computing device may result in lower productivity and user frustration in the use of the computing device. This, in turn, may lower client satisfaction in the computing device.

Some computing devices overcome tipping issues by placing additional "dummy" weight in the first or lower portion of the clamshell form factor computing device. However, because the market desires lighter, less, massive, computing devices, addition of weight without provisioning additional functionality via that weight is an unattractive solution.

Some computing devices include kickstands or portions of the second or top portion of the clamshell form factor devices that are formed to touch a surface on which the computing devices are used. These kickstands and other formations function to bear the weight of the second or top portion of the clamshell form factor and are used to support the computing device. However, these kickstands add undesirable mass to the overall computing device and often need the user to take an additional step in order to use the computing device. Further, inclusion of a kickstand or other weight bearing formation in the computing device increases the thickness and mass of the computing device. Consumers in the market of purchasing computing devices seek for slimmer, less massive, and less bulky computing devices.

Examples described herein provide a system for adjusting the center of mass of a computing device. The system includes a base that is slidebly coupled to a first portion of the computing device. As described above, a keyboard, touch mouse pad, and other input devices are included in a first or lower portion of the clamshell form factor computing device. The base repositions the first portion of the computing device relative to the base to shift the center of mass of the computing device to compensate for a mass of a second portion of the computing device.

As described above, a display device may be included in a second or top portion of the clamshell form factor. In another example, the computing device is a tablet computing device in which a selectively attachable keyboard/touch mouse pad interface components are coupled to the tablet in order to provide additional input methods apart from, for example, a touch input system incorporated into the display of the tablet computing device. The tablet computing device may make up the greater portion of mass of the overall computing device including the first and the second portion of the computing device. In this example, the first portion including the keyboard/touch mouse pad interface components is slidably coupled to the base. In one example, the base is slidably coupled to the first portion via a rail system. The rail system may include a clutch system, a magnetic system, a viscous grease, or combinations thereof to assist in the sliding of the first portion of the computing device relative to the base.

In one example, compensation for the mass of the second portion of the computing device is performed upon rotation of the second portion about the axis of rotation relative to the first portion. For example, in the clamshell form factor computing device, the first portion of the computing device including the keyboard/touch mouse pad interface components slides relative to the base as the second portion of the computing device including the display device is rotated about the common axis of rotation that makes up the clamshell form factor computing device.

In one example, the base further includes a number of hinges. In this example, at least one of the hinges pushes the first portion relative to the base to shift the center of as of the computing device to compensate for a mass of a second portion of the computing device.

Thus, examples described herein provide a computing device that does not include a support for the second portion or additional weight placed within the computing device to compensate for an unbalanced center of gravity. In this manner, the examples described herein provide for thinner, less massive computing devices that are not prone to tipping due to an unbalanced center of gravity.

Examples described herein also provide a base for adjusting the center of mass of a computing device. The base includes a number of rails. The rails are slidably coupled between the base and the first portion of the computing device. In this manner, the first portion of the computing device including the keyboard/touch mouse pad interface components are slidably separable from the second portion of the computing device including the display device. This allows more mass to be shifted from a common axis of the clamshell form factor of the computing device in order to shift the center of mass and reduce or eliminate the possibility of the mass of the second portion from outweighing the first portion and causing the overall computing device to tip over.

Any number of devices or systems may be used to couple the first portion of the computing device to the second portion of the computing device in order to assist in or bring about the shifting of the first portion relative to the second portion. In one example, the base includes a number of hinges. At least one of the hinges pushes the first portion relative to the base to shift the center of mass of the computing device to compensate for a mass of a second portion of the computing device.

In one example, a friction maintaining coating is disposed on a side of the base opposite the first portion so that the base does not slip along the surface of, for example, a desktop as the clamshell form factor computing device is opened and used. In another example, the computing device may include a number of feet instead of or in addition to the friction maintaining coating.

In one example, the base or a combination of the base and first portion of the computing device may be sold as an after-market peripheral device. In this example, the user may have a tablet computing device with which the base, the first portion, or a combination thereof is compatible with the tablet computing device.

In one example, the computing device does not include kickstands or portions of the second or top portion of the clamshell form factor device that is formed to touch a surface on which the computing devices are used. In this example, the computing device does not include additional weight or devices that may break or wear.

As used in the present specification and in the appended claims, the term "center of mass" or similar terminology is meant to be understood broadly as a unique point where the weighted relative position of the distribution of mass of an object in space sums to zero. When used in connection with the examples described herein, and in one example, the center of mass of a computing device is shifted by moving a number of elements in space, including the first portion including the keyboard, touch mouse pad, and other input devices, to ensure that the center of mass remains approximately static or is shifted to compensate for the movement of other elements of the computing device such as the second portion including the display device.

Further, as used in the present specification and in the appended claims, the term "selectively coupleable" or similar language is meant to be understood broadly as the ability to remove and reattach a number of components without destruction of the components or associated elements. When used in connection with the examples described herein, and in one example, the second portion or display device of the clamshell form factor computing device may be removed from the first portion or keyboard device, and reattached without destroying any components of the first and second portions or any components associated therewith including the base. In this example, the second portion of the computing device may be removed from the clamshell form factor computing device and used as a tablet device, for example.

Still further, as used in the present specification and in the appended claims, the term "support" or similar language as used as a noun is meant to be understood broadly as any device or structure or any portion of a device that is used to bear the weight of that device or a portion thereof. When used in connection with the examples described herein, a support is not used to bear the weight of, for example, the second portion or display portion of a clamshell form factor computing device.

Even still further, as used in the present specification and in the appended claims, the term "a number of" or similar language is meant to be understood broadly as any positive number composing 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
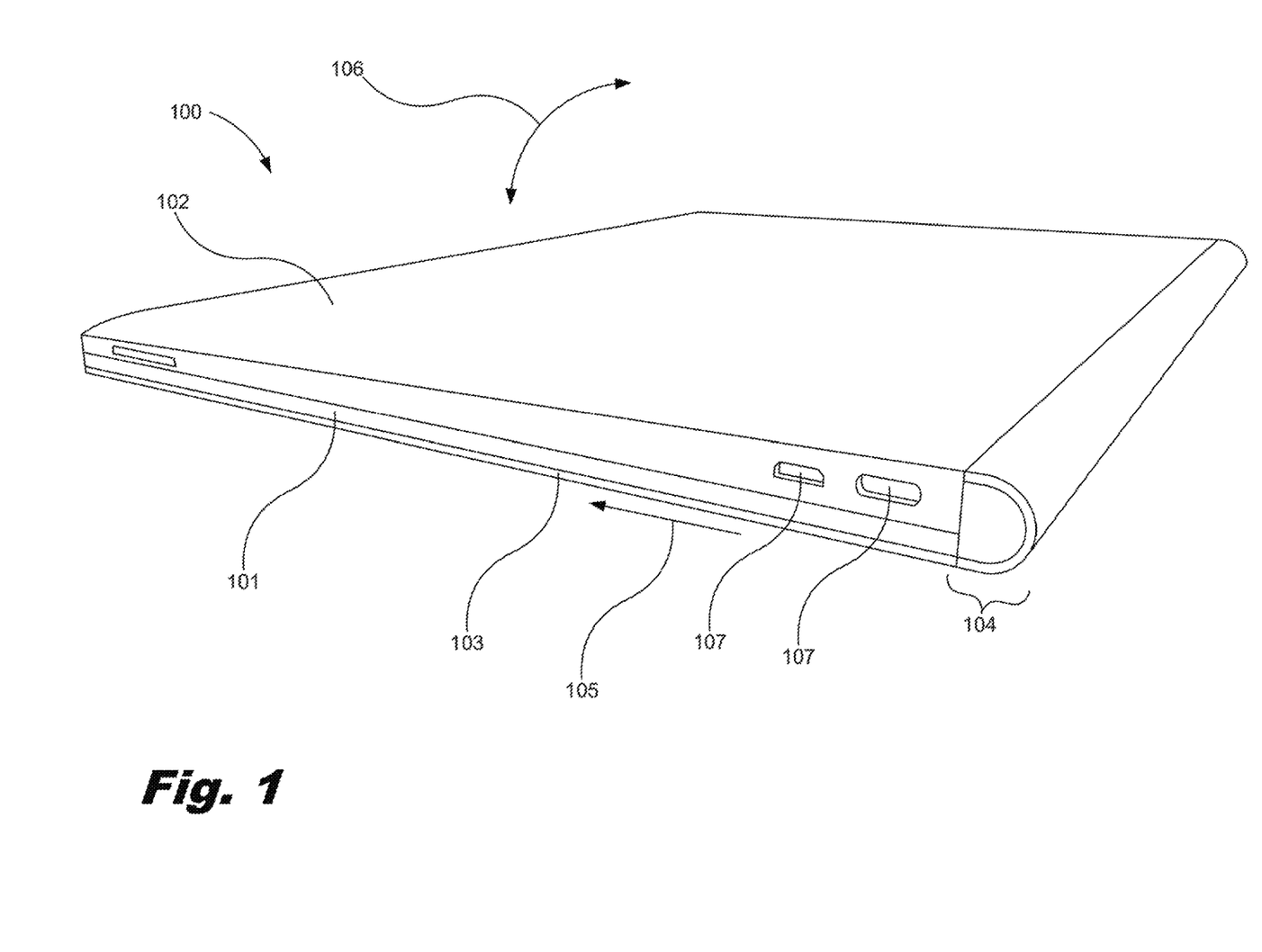
FIG. 1 is a top isometric view of a cots outing device including a base for adjusting the center of mass of the computing device, according to one example of the principles described herein.

FIG. 1 is a top isometric vie of a computing device (100) including a base (103) for adjusting the center of mass of the computing device (100), according to one example of the principles described herein. The computing device may be a laptop computing device, a tablet computing device, an all-in-one desktop with a foldable keyboard, a mobile phone, a smartphone computing device, or any other type of computing device. The computing device (100) includes a first (101) or lower portion and a second (102) or top portion. The first portion (102) includes, for example, a keyboard, touch mouse pad, and other input devices.

The second portion (102) includes, for example, a display device. In one example, the display device of the second portion (102) is a touch-manipulatable display device that a user controls through one or a plurality of touch gestures by touching the screen with a stylus or a number of fingers. The second portion (102) may include a number of electrical connections (107) including power connectors and data transfer connectors.

As mentioned above, the computing device may include a clamshell form factor computing device (100) with an axis of rotation common between the first portion (101) and a second portion (102) as designated by 104. Any number of connections including, for example, hinges may be used to couple the first portion (101) to the second portion (102).

The computing device further includes a base (103). The base is coupled to the first portion (101) of the computing device (100). In one example, the base (103) is slidably coupled to the first portion (101) in order to tallow the first portion (101) of the computing device to slide in the direction of arrow (105) as the clamshell form factor computing device (100) is opened. The clamshell form factor computing device (100) opens and closes as indicated by arrow (106) with the first portion (101) rotationally separating from the second portion (102).

Figure 2:
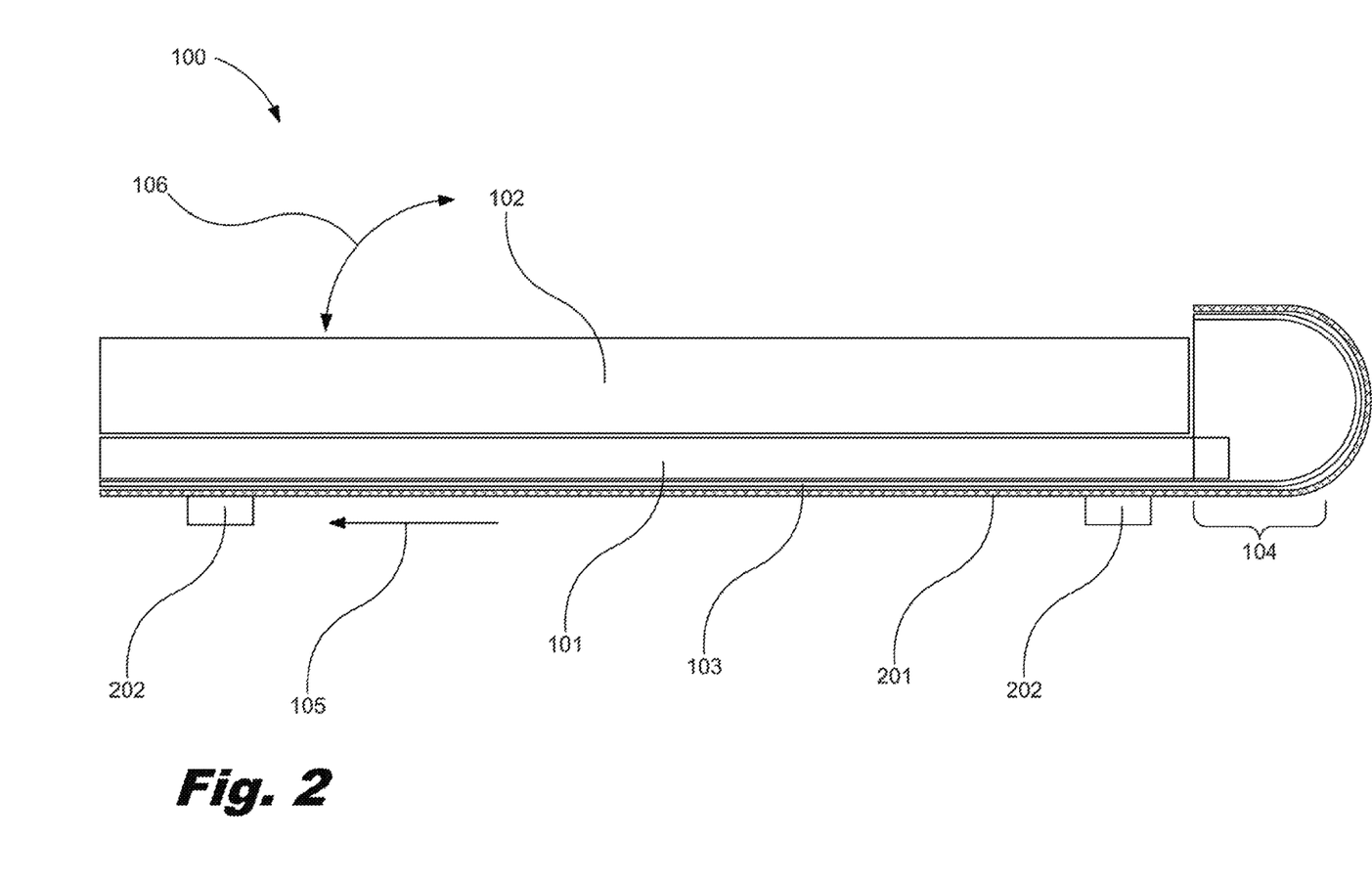
FIG. 2 is a side view of the computing device including the base of FIG. 1, according to one example of the principles described herein.

FIG. 2 is a side view of the computing device (100) including the base (103) of FIG. 1, according to one example of the principles described herein. In addition to the elements described above in connection with FIG. 1, a friction maintaining coating (201) may be disposed on the side of the base (103) opposite the first portion (101) so that the base (103) does not slip along the surface of, for example, a desk or other surface on which the computing device (100) is being used. The friction maintaining coating (201) may be made of any material with a coefficient of friction that is relatively higher than that of the base (103), a surface on which the computing device (100) is placed and used, or combinations thereof. In this manner, the computing device (100) will not slip along the utilized surface as it is opened by the user. In one example, the friction maintaining coating (201) is a rubber or silicon material.

In another example or in addition to the friction maintaining coating (201), a number of feet (202) may be coupled to the base (103) opposite the first portion (101). In this manner, the base (103) is prevented from slipping along the surface, and provides ventilation and cooling to the computing device (100) and its subcomponents by dissipating heat.

FIGS. 3 through 9 are side cut-away views of the computing (100) including the base (103) in a number of states of operation, according to one example of the principles described herein. The first portion (101), second portion (102), base (103), and a number of rails (304) are depicted in FIGS. 3 through 9 as being truncated m order to depict details of the axis of rotation (104) including a number of hinges (301, 302, 303), the rails (304), and a hinge lever (305). However, the first portion (101), second, portion (102), base (103), and rails (304) may have any length suitable for a particular use.

Further, as mentioned above, the second portion (102) may include a tablet computing device that is selectively attachable to the first portion (101). In this example, a number of electrical and mechanical connectors may be included to allow the second portion (102) to interface with the first portion (101) and base (103).

Figure 3:
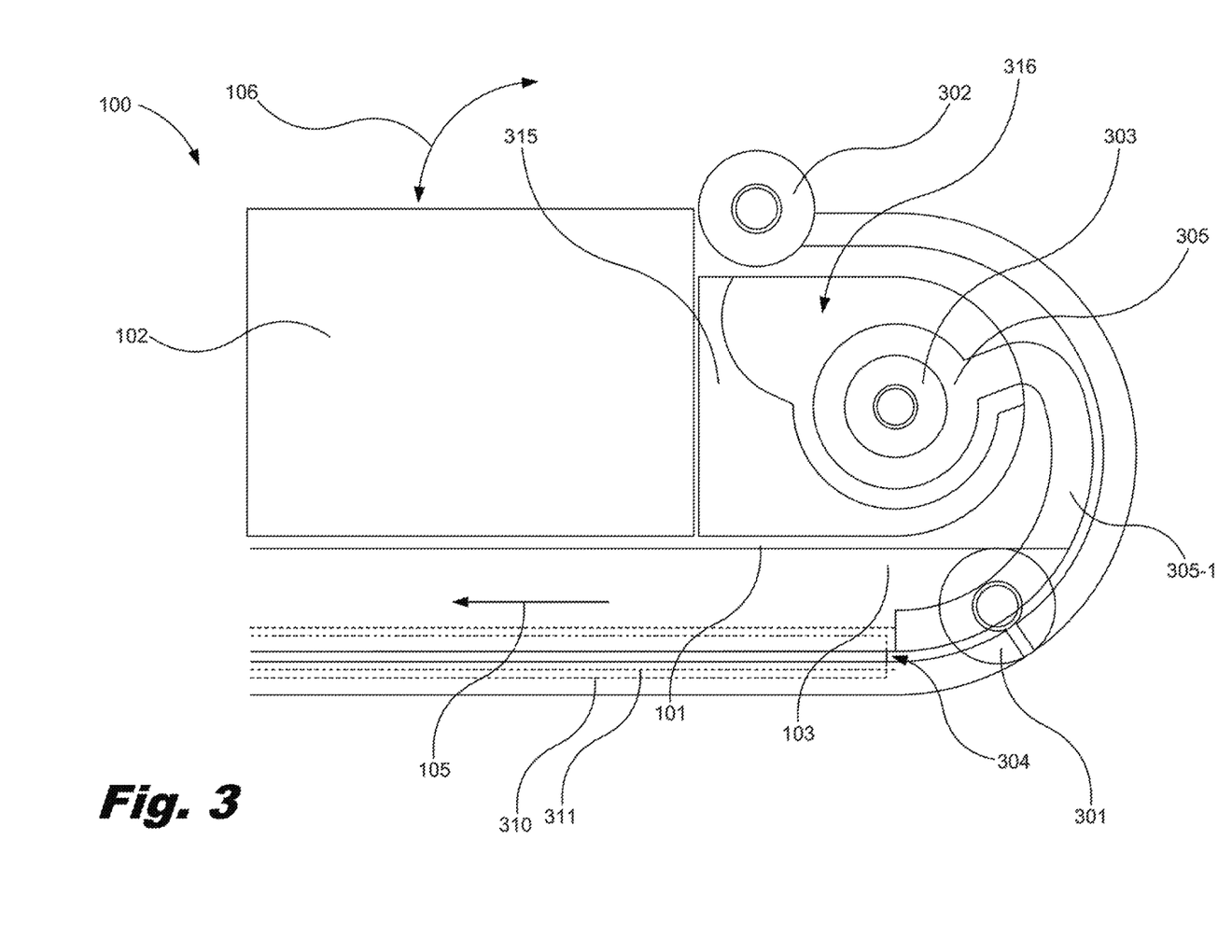
FIG. 3 is a side cut-away view of the computing device including the base in a first state of operation, according to one example of the principles described herein.
Figure 4:
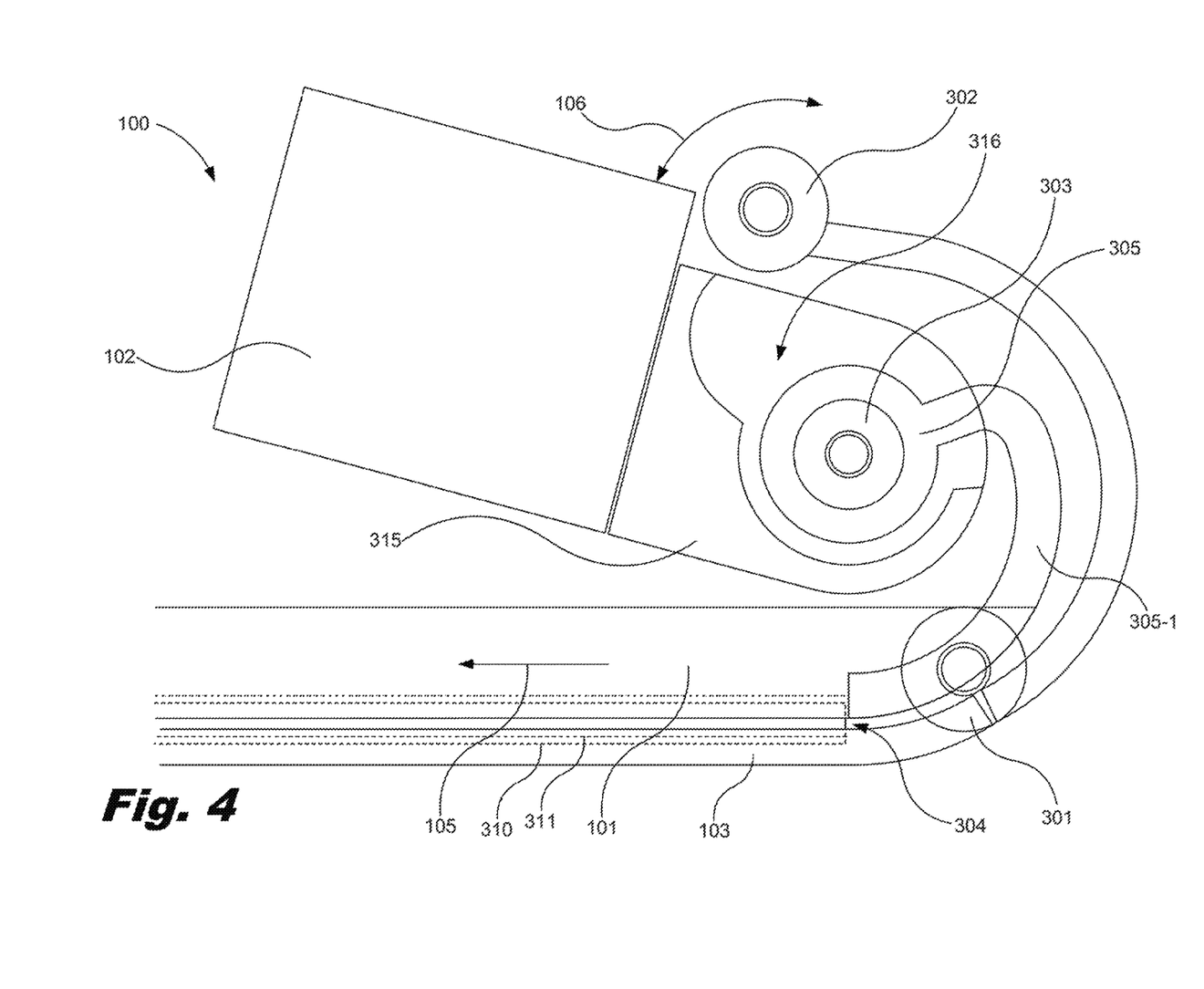
FIG. 4 is a side cut-away view of the computing device including the base in a second state of operation, according to one example of the principles described herein.
Figure 5:
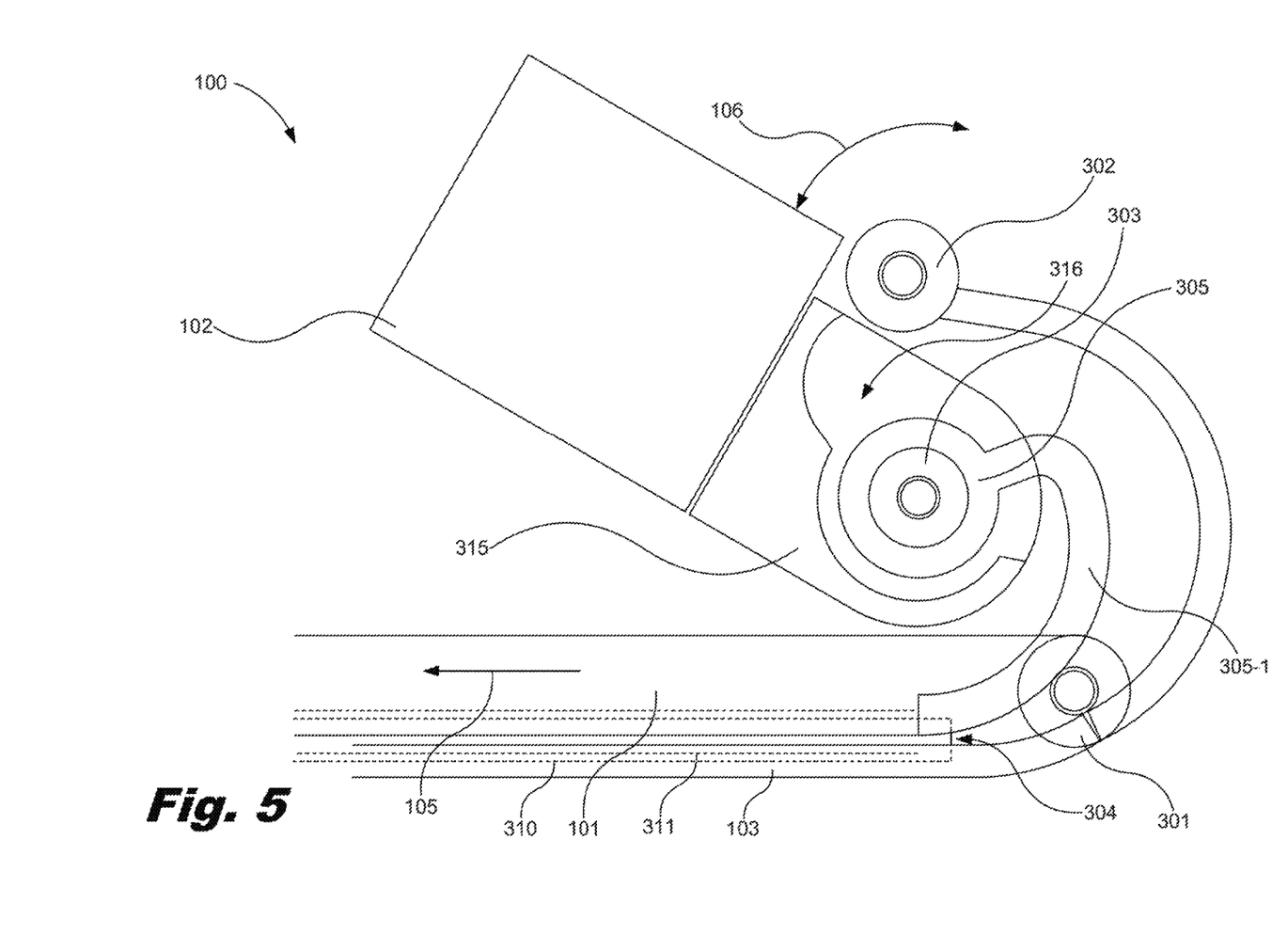
FIG. 5 is a side cut-away view of the computing device including the base in a third state of operation, according to one example of the principles described herein.
Figure 6:
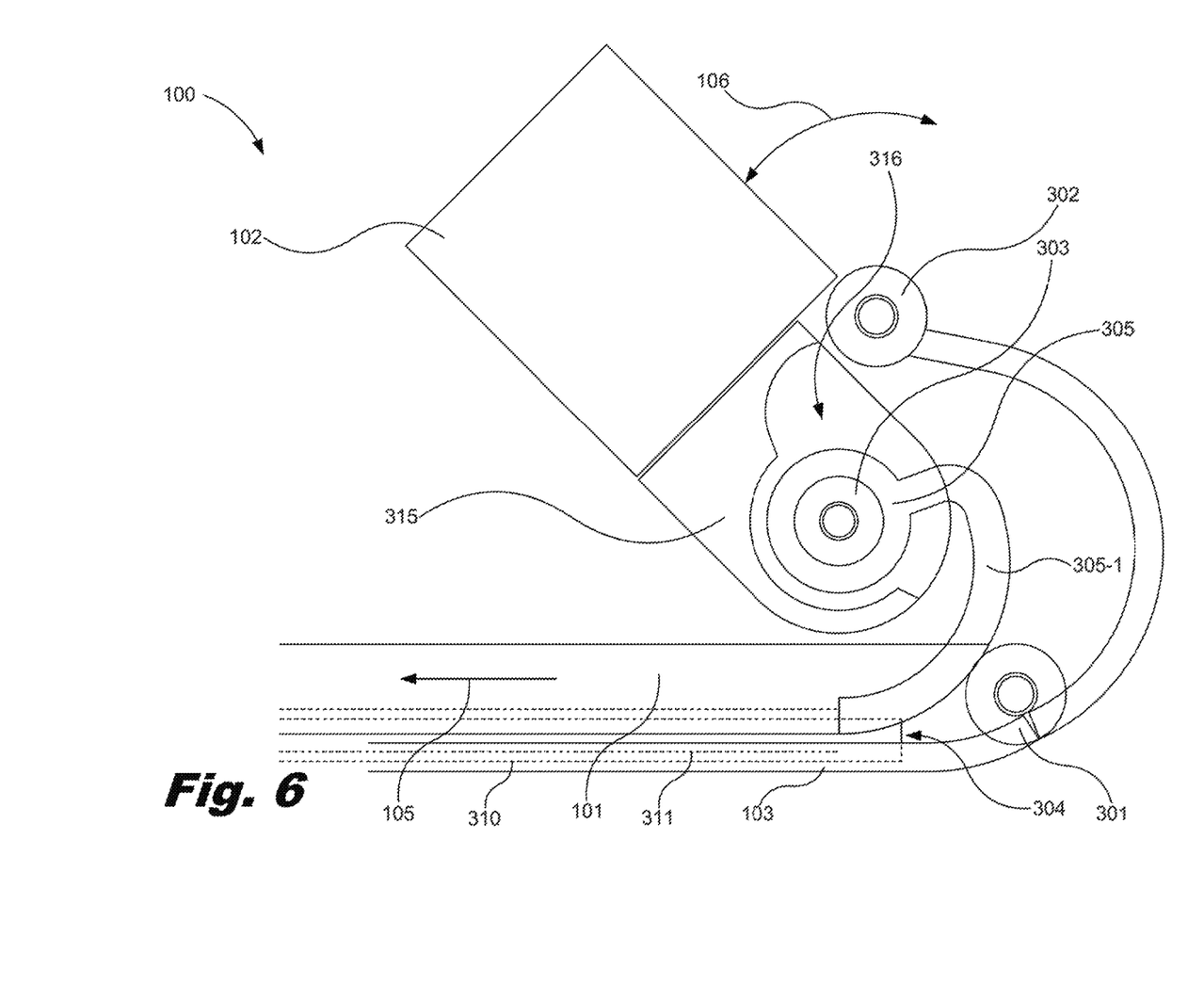
FIG. 6 is a side cut-away view of the computing device including the base in a fourth state of operation, according to one example of the principles described herein.
Figure 7:
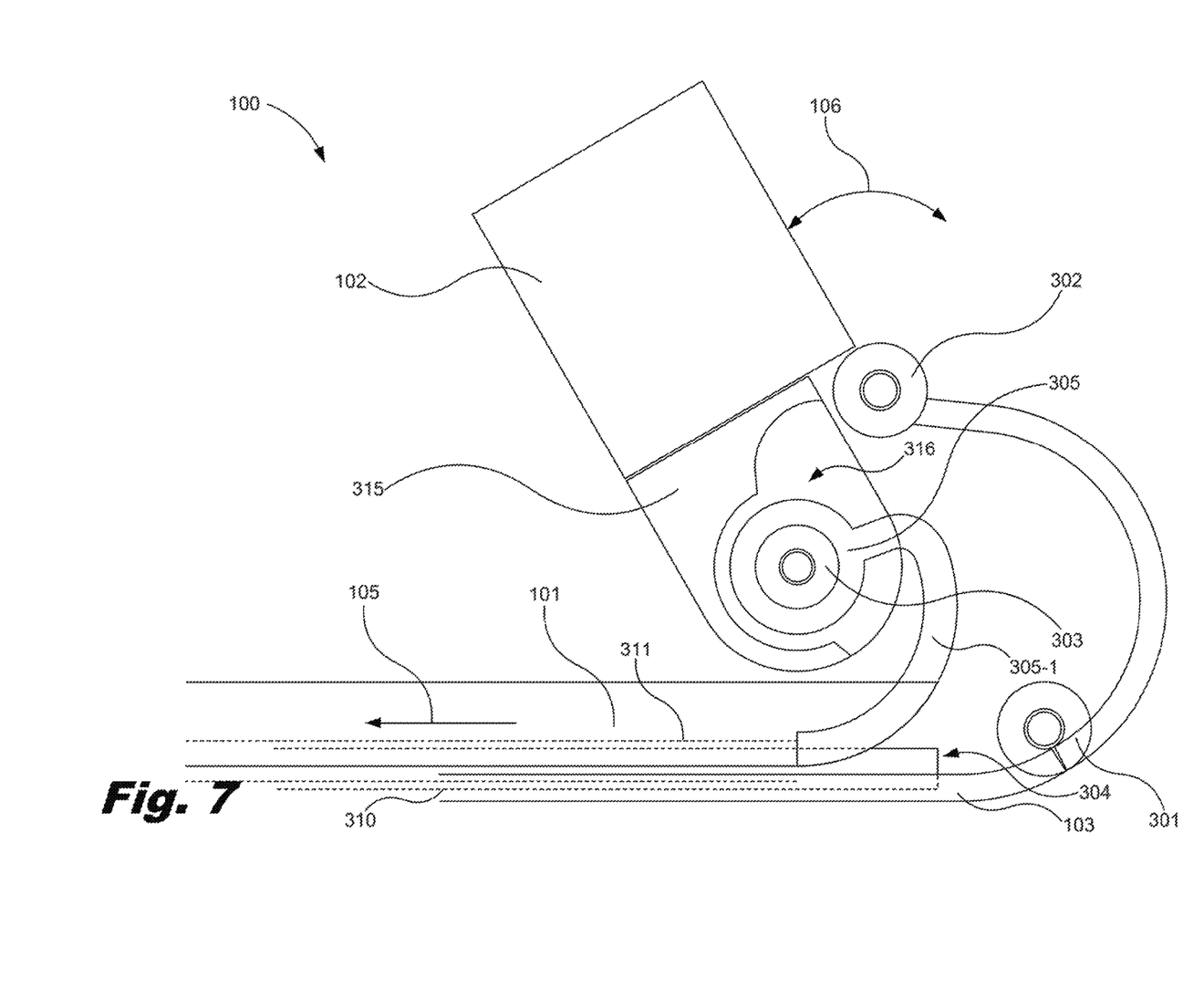
FIG. 7 is a side cut-away view of the computing device including the base in a fifth state of operation, according to one example of the principles described herein.
Figure 8:
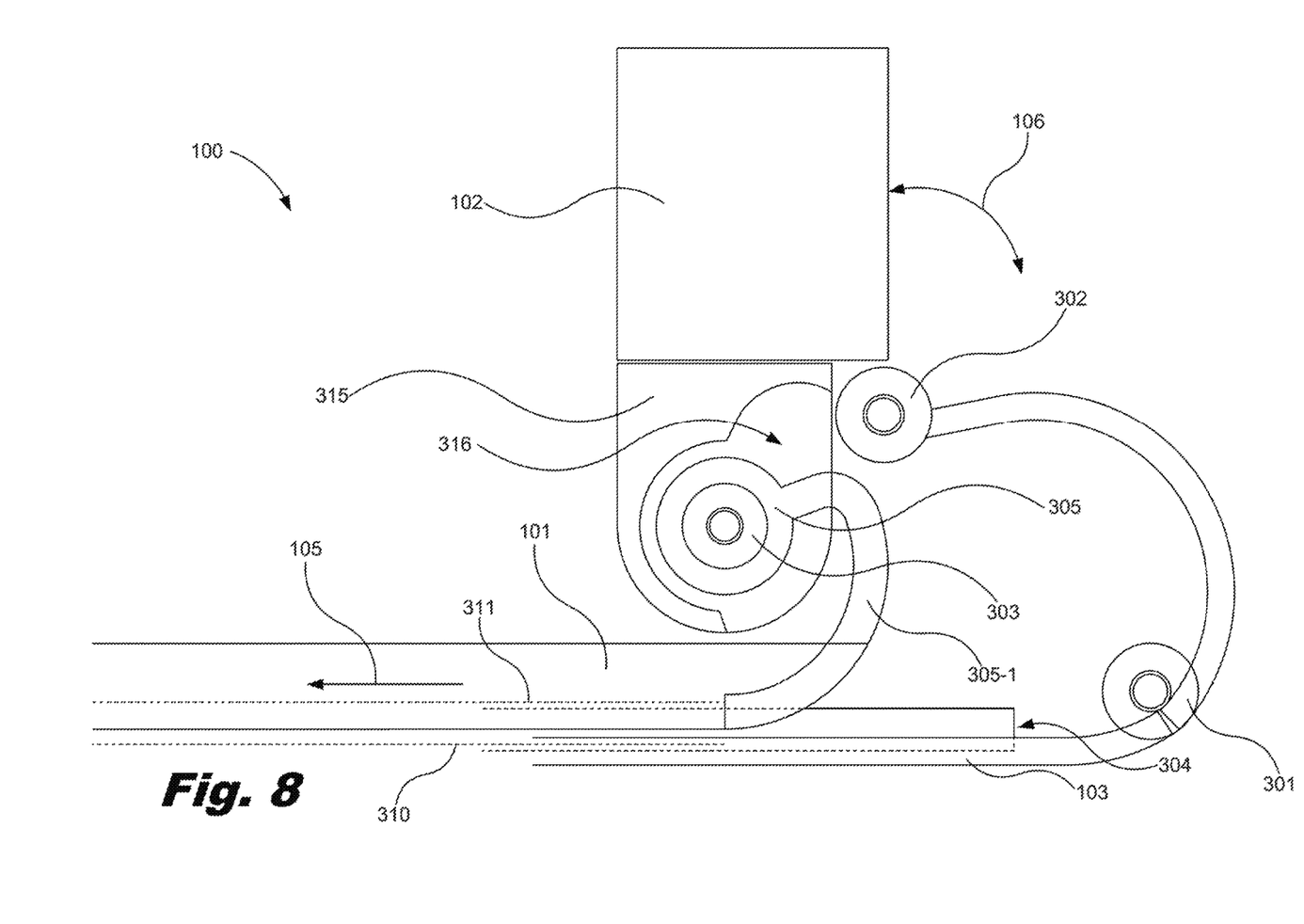
FIG. 8 is a side cut-away view of the computing device including the base in a sixth state of operation, according to one example of the principles described herein.
Figure 9:
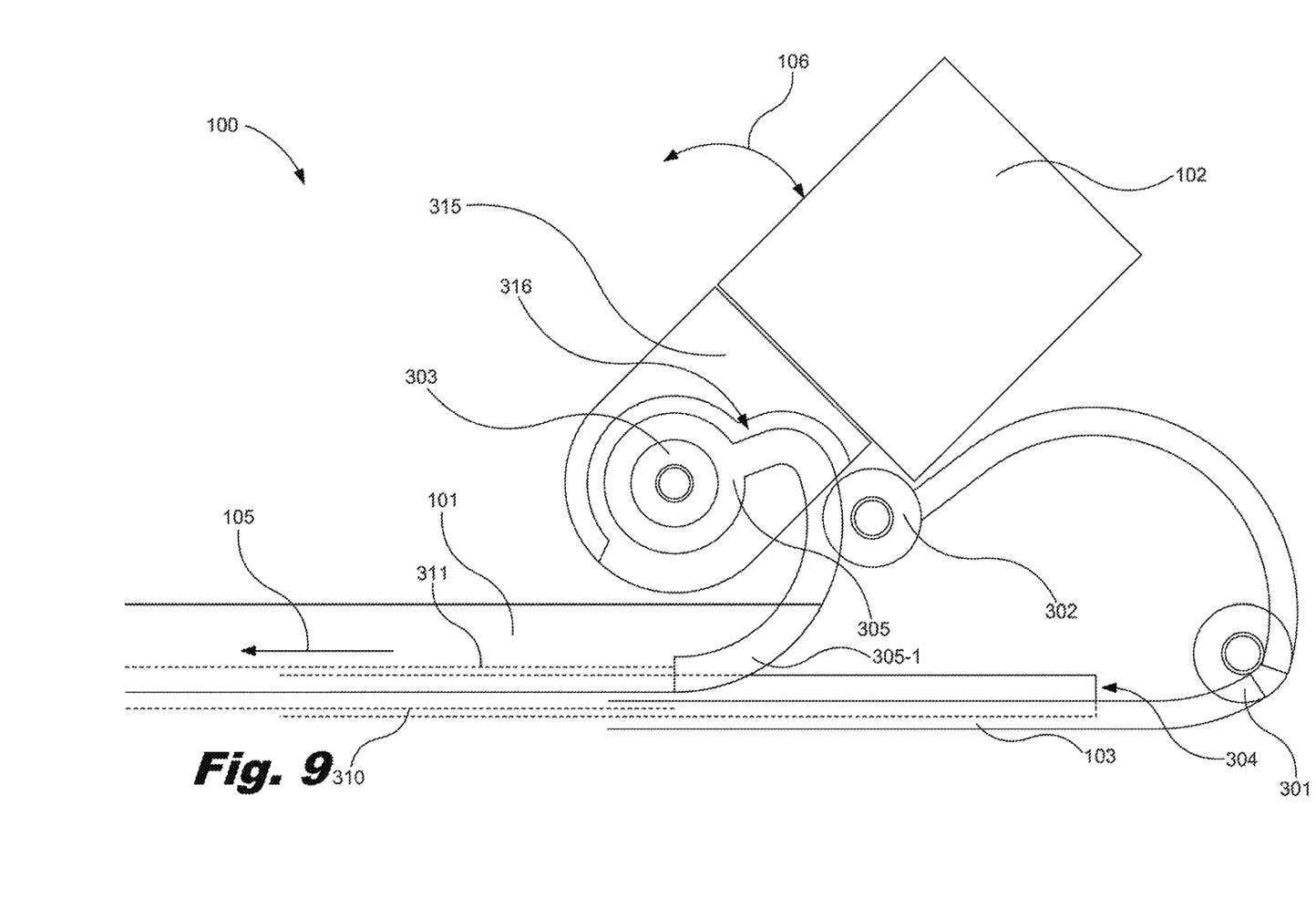
FIG. 9 is a side cut-away view of the computing device including the base in a seventh state of operation, according to one example of the principles described herein.

FIG. 3 depicts the computing device (100) in a fully closed orientation, FIG. 9 depicts the computing device (100) in a fully open orientation, and FIGS. 4 through 8 depict the computing device (100) in intermediary orientations between fully closed and fully open. As depicted through the series of FIGS. 3 through 9, a number of hinges (301, 302, 303), a number of rails (304), and a hinge lever (305) facilitate in the opening of the clamshell form factor computing device (100) in the direction indicated by arrow (106), and force the first portion (101) forward in the direction indicated by arrow (105). Although three hinges (301, 302, 303) are depicted throughout the figures, any number of hinges including more or fewer than three hinges may be included in the examples described herein. In one example, the three hinges (301, 302, 303) extend along the length of the axis of rotation common between the first portion (101) and a second portion (102) as designated by 104 in FIG. 1.

Hinge (303) may be housed in a hinge housing (315). The hinge housing (315) is coupled to hinge (302) in order to provide an axis of rotation around which the hinge housing (315) and hinge (303) may rotate. The hinge housing (315) includes a hinge recess (316) into which the various portions of the hinge (303) and the hinge lever (305) may reside when the computing device (100) is in a closed orientation, an open orientation or any orientation in between.

In another example, a number of each of the threw hinges (301, 302, 303) may be included along the length of the axis of rotation (104) common between the first portion (101) and a second portion (102). In this example, a plurality of hinge levers (305) may be included with the sets of three hinges (301, 302, 303) to assist in the movement of the first portion (101) along the number of rails (304) as described herein. This example utilizing distinct sets of three hinges (301, 302, 303) reduces the overall weight of the computing device (100).

As depicted throughout FIGS. 3 through 9, the first portion (101) moves in the direction of arrow (105) via the use of hinge (303) and hinge lever (305) as the second portion (102) moves in the direction of arrow (106). The hinge lever (305) is coupled to the first portion (101) via a hinge lever arm (305-1), and the hinge lever arm (305-1) pushes the first portion (101) away from the common axis of rotation (FIG. 1, 104) of the clamshell form factor computing device (100) and in the direction of arrow (105) when the second portion moves in direction of arrow (106). In one example, the hinge (303) allows the second portion (102) to move between 0 degrees parallel with the first portion as depicted in FIG. 3, to approximately 135 degrees as depicted in FIG. 9. In other examples, the hinge (303) and the hinge lever (305) may be designed such that the second portion (102) moves between approximately 0 and 360 degrees relative to the first portion.

In one example, hinge (303), hinge (304, or both, are torque hinges. Torque hinges may be used to support objects at a specific angular positions relative to a main body. Thus, in this example, hinge (303), hinge (302), or both, are torque hinges used in connection with the clamshell form factor computing device (100) to support the second portion (102) comprising the display at any angular location relative to the first portion (101) and the base (103). The torque hinges support these hinged elements such that a constant resistance, or torque, must be overcome in order to initiate movement of the second portion (102) relative to the first portion (101) throughout the entire range of motion.

In one example, the torque hinges (302, 303) may be used in conjunction with the rails (304) described herein, in this example, the torque hinges (302, 303) may assist in the rails (304) in providing resistance or torque, that must be overcome in order to initiate movement of the second portion (102) relative to the first portion (101), in this example, the second portion (102) may include a large display that may benefit from additional torque provided via both the rails (304) and the torque hinges (302, 303).

In another example, the rails (304) provide free movement of the base (103) relative to the first portion (101) while the torque hinges (302, 303) provide the resistance or torque, that must be overcome in order to initiate movement of the second portion (102) relative to the first portion (101).

Figure 10:
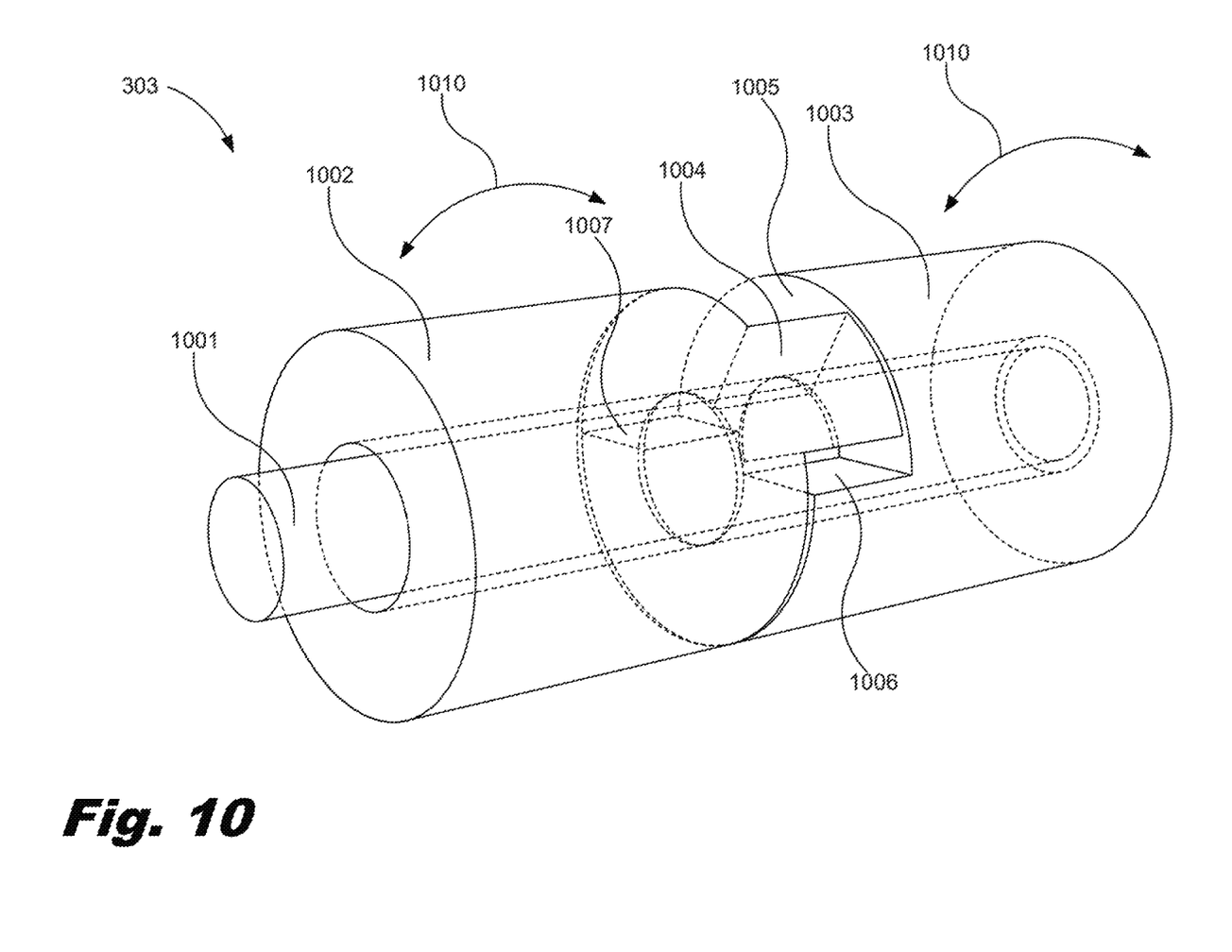
FIG. 10 is an isometric view of a looking hinge used in the computing device of FIG. 1, according to one example of the principles described herein.

In one example, a number of the hinges (301, 302, 303) may include a locking hinge (1000). The locking hinge (1000) is a locking feature that restricts the angel at which the clamshell form factor computing device (100) may open by restricting the angular movement of the hinge. FIG. 10 is an isometric view of the locking hinge (1000) used in the computing device (100) of FIG. 1, according to one example of the principles described herein. The locking hinge (1000) may be incorporated into any number of the hinges (301, 302, 303) depicted in FIGS. 3 through 9.

The locking hinge (1000) includes s shaft (1001), a first barrel (1002) formed around the shaft (1001) along the axis of the shaft (1001), and a second barrel (1003) formed around the shaft (1001) along the axis of the shaft (1001). The first barrel (1002) includes a protrusion (1004) that overlaps the second barrel (1003) in a recess (1005) defined in the second barrel (1003). One of the first barrel (1002) and the second barrel (1003) is coupled to the first portion (101) of the computing device (100), and the other of the first barrel (1002) and the second barrel (1003) is coupled to the second portion (102) of the computing device (100).

The action of the first barrel (1002) with respect to the second barrel (1003) is depicted by arrows (1010) where each of the first barrel (1002) and the second barrel (1003) is rotatable about the shaft (1001). The protrusion (1004), during rotation of the first barrel (1002) with respect to the second barrel (1003) is stopped by one of the two stopping surfaces (1006, 1007). The angular distance the first barrel (1002) may travel with respect to the second barrel (1003) between the two stopping surfaces (1006, 1007) defines the angel at which the second portion (102) may be angularly moved away from the first portion (101) as indicated by arrow (106) of FIGS. 1 through 9. The protrusion (1004), the recess (1005), or both may be formed of varying sizes to provide for a greater or smaller angle of rotation. In one example, the angel of rotation is between 0 and 135 degrees. However, any range of angles defined by the protrusion (1004), the recess (1005), the two stopping surfaces (1006, 1007), or combinations thereof may be used in the examples described herein.

Turning again to FIGS. 3 through 9, a number of rails (304) are incorporated into the base (103) and the first portion (101) of the computing device (100). Any number of rails may be used along the width of the first portion (101) of the computing device (100), the width of the first portion (101) being the side running parallel with the axis of rotation (104). The rails (304) run perpendicular to the axis of rotation (104) as depicted in FIGS. 3 through 9. The rails (304) assist in the movement of the first portion (101) relative to the base (103) as the hinge lever arm (306-1) of the hinge lever (305) moves the first portion in the direction of arrow (105). In one example, male (311) and female (310) portions of the rails (304) are incorporated into the first portion (101) and the base (103), respectively.

In one example, the rails (304) include a number of indentions or protrusions along a male portion (311) of the rails (304). The female portion (310) of the rails (304) includes a number of rollers and rubber springs, which ensure that the rollers always contact the other half of the rails (304). The indentions or protrusions may be placed along the length of the male portion (311) of the rails (304) so that when the first portion (101) moves relative to the base (103), the first portion (101) stops and holds at the interval defined by the indentions or protrusions while opening the clamshell form factor computing device (100). In this manner, the second portion (102) of the computing device (100) may be held at, for example an approximately vertical position, at a 110 degree position relative to the first portion (101), at a 135 degree position relative to the first portion (101), or any other position between 0 degrees and the total angular movement of the computing device (100) as defined by the placement of the indentions or protrusions along the length of the rails (304). This, therefore, allows the moveable elements of the computing device (100) to stop and hold at a number of intervals while opening the clamshell form factor computing device (100).

Although a r umber of rails (304) are used in the present example, any type of device that conveys the first portion (101) with respect to the base (103) may be used. In one example, the rails (304) include a clutch system, a magnetic system, a viscous grease, or combinations thereof to assist in the movement of the first portion (101) with respect to the base (103).

In another example, the rail system may include a number of pairs of magnetic devices such as electromagnets or ferrimagnets that may be placed along the length of the male portion (311) and female portion (110) of the rails (304) so that when the first portion (101) moves relative to the base (103), the first portion (101) stops and holds at the interval defined by the placement of the pairs of magnetic devices while opening the clamshell form factor computing device (100). In this manner, the second portion (102) of the computing device (100) may be held at, for example, any position between 0 degrees (closed clamshell form factor computing device) and the total angular movement of the computing device (100) as defined by the position of the pairs of magnets along the length of the rails (304). For example, an approximately vertical or 90 degree position dative to the first portion (101), a 110 degree position relative to the first portion (101), a 135 degree position relative to the first portion (101), or any other position between 0 degrees and the total angular movement of the computing device (100) as defined by the position of the pairs of magnets along the length of the rails (304) may be obtained. This, therefore, allows the moveable elements of the computing device (100) to stop and hold at a number of intervals while opening the clamshell form factor computing device (100).

Having described the system for adjusting the center of mass of a computing device, it is noted that various adjustments may be made to the system. In one example, mass may be added to the first portion (101) in addition to the first portion (101) being cause to protrude away from the axis of rotation (104). In another example, mass may not be added to the first portion (101). In this example, the keyboard protrusion forward compensates enough for the weight of the second portion (102) to change the center of gravity such that the computing device will not tip backwards due to the weight of the second portion.

In one example, the base (103), first portion (101), or combinations thereof may be sold as an after-market peripheral device, accessory, or may otherwise be sold separately from the second portion (102). In one example, the second portion is a tablet computing device that may be sold separate from, for example, a selectively attachable input device such as a keyboard, a touch mouse pad, and other input devices.

In another example, the base (103) is sold as the after-market accessory or device. In this example, the base (103)

may be coupled to the first portion (101) of the computing device (100) via adhesives or through the use of existing screws, screws included with the after-market base (103), other coupling devices, or combinations thereof.

In the above description, the computing device (100) functions to shift the center of mass of the computing device in order to reduce or prevent the possibility of the computing device (100) tipping over due to the mass of the second portion (102) being higher than the mass of the first portion (101). Thus, the specification and figures describe an example system for adjusting the center of mass of a computing device includes a base slidably coupled to a first portion of the computing device. The base repositions the first portion of the computing device relative to the base to shift the center of mass of the computing device to compensate for a mass of a second portion of the computing device.

This adjustment of the center of mass of the computing device may have a number of advantages, including: (1) reduction or elimination of tipping of the computing device; (2) reduction or elimination of damage to the computing device due to forces exerted against the computing device if tipped; and (3) increased productivity by a user who is using the computing device, among other advantages described herein.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for adjusting the center of mass of a computing device comprising:
    a base slidably coupled to a first portion of the computing device;
    a first hinge rotatably coupling the first portion and a second portion of the computing device about an axis of rotation;
    a hinge lever coupled to the first hinge and rotatable with the first hinge,
    wherein the hinge lever pushes the first portion relative to the base as the second portion rotates relative to the first portion about the axis of rotation such to reposition the first portion of the computing device relative to the base via the hinge lever shifts the center of mass of the computing device to compensate for a mass of the second portion of the computing device upon rotation of the second portion about the axis of rotation relative to the first portion; and
    a second hinge coupled between the base and a hinge housing that houses the first hinge, wherein the second hinge creates a second axis of rotation around which the hinge housing and first hinge rotate.

2. The system of claim 1, wherein:
    the first portion of the computing device is a keyboard, and
    the second portion of the computing device is a display device that rotates relative to the first portion about an axis of rotation.

3. The system of claim 2, wherein the display device is selectively coupleable with respect to the first portion.

4. The system of claim 1, wherein the base is slidably coupled to the first portion via a rail system.

5. The system of claim 4, wherein the rail system comprises a clutch system, a magnetic system, a viscous grease, or combinations thereof.

6. The system of claim 1, wherein the system does not comprise a support for the second portion.

7. A base for adjusting the center of mass of a computing device comprising:
    a number of rails, the rails to slidably couple the base to a first portion of the computing device,
    wherein the rails reposition the first portion of the computing device relative to the base, and
    a first hinge coupling the first portion and a second portion, the first hinge comprising a hinge lever,
    wherein the hinge lever pushes the first portion relative to the base as the second portion rotates relative to the first portion about an axis of rotation of the first hinge such that the repositioning the first portion of the computing device relative to the base via the hinge lever shifts the center of mass of the computing device to compensate for a mass of the second portion of the computing device upon rotation of the second portion about the axis of rotation relative to the first portion; and
    a second hinge coupled between the base and a hinge housing that house the first hinge, wherein the second hinge creating a second axis of rotation around which the hinge housing and first hinge rotate.

8. The base of claim 7, wherein:
    the first portion of the computing device is a keyboard, and
    the second portion of the computing device is a display device that rotates relative to the first portion about an axis of rotation.

9. The base of claim 7, further comprising a friction maintaining coating disposed on a side of the base opposite the first portion.

10. A clamshell form factor computing device comprising:
    a keyboard comprising a number of inputs;
    a base slidably coupled to the keyboard;
    a first hinge rotatably coupling the first portion and a second portion of the computing device about an axis of rotation; and
    a hinge lever coupled to the first hinge and rotatable with the first hinge,
    wherein the hinge lever pushes the first portion relative to the base as the second portion rotates relative to the first portion about the axis of rotation such that the repositioning the first portion of the computing device relative to the base via the hinge lever shifts the center of mass of the computing device to compensate for a mass of the second portion of the computing device upon rotation of the second portion about the axis of rotation relative to the first portion; and
    a second hinge coupled between the base and a hinge housing that house the first hinge, wherein the second hinge creates a second axis of rotation around which the hinge housing and first hinge rotate.

11. The computing device of claim 10, wherein:
    the computing device is a tablet computing device,
    the tablet computing device, when coupled to the keyboard, rotates relative to the keyboard about an axis of rotation, and
    repositioning the first portion of the computing device relative to the base shifts the center of mass of the computing device to compensate for a mass of the tablet computing device upon rotation of the tablet computing device about the axis of rotation relative to the keyboard.

12. The computing device of claim 10, wherein the base is slidably coupled to the keyboard via a rail system.

13. The computing device of claim 10, wherein the keyboard is sold as an after-market peripheral device.

14. The system of claim 1, wherein the hinge lever comprises a hinge lever arm.

15. The system of claim 1, wherein the hinge lever arm is coupled to the first portion.

16. The base of claim 7, wherein the hinge lever comprises a hinge lever arm, wherein the hinge lever arm is coupled to the first portion.

17. The computing device of claim 10, wherein the hinge lever comprises a hinge lever arm, wherein the hinge lever arm is coupled to the first portion.

* * * * *